US012165106B2

(12) United States Patent
Lucas (10) Patent No.: US 12,165,106 B2
(45) Date of Patent: Dec. 10, 2024

(54) DATA CLASSIFICATION IN APPLICATION PROGRAMMING INTERFACES AT ATTRIBUTE LEVEL

(71) Applicants: Atlassian Pty Ltd., Sydney (AU); Atlassian Inc., San Francisco, CA (US)

(72) Inventor: Diogo Lucas, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 265 days.

(21) Appl. No.: 17/206,880

(22) Filed: Mar. 19, 2021

(65) Prior Publication Data

US 2021/0304143 A1 Sep. 30, 2021

Related U.S. Application Data

(60) Provisional application No. 63/002,589, filed on Mar. 31, 2020.

(51) Int. Cl.
*G06Q 10/101* (2023.01)
*G06F 16/903* (2019.01)

(52) U.S. Cl.
CPC ..... *G06Q 10/101* (2013.01); *G06F 16/90335* (2019.01)

(58) Field of Classification Search
CPC ............ G06Q 10/101; G06F 16/90335; G06F 21/6245
See application file for complete search history.

(56) References Cited

U.S. PATENT DOCUMENTS

| | | | |
|---|---|---|---|
| 8,782,744 B1 * | 7/2014 | Fuller | G06F 21/629 709/225 |
| 9,602,482 B1 * | 3/2017 | Roth | H04L 63/107 |
| 9,667,704 B1 * | 5/2017 | Sonawane | H04L 67/63 |
| 11,245,728 B1 * | 2/2022 | Curtis | H04L 63/20 |
| 2008/0209451 A1 * | 8/2008 | Michels | G06F 15/16 719/328 |
| 2012/0222083 A1 * | 8/2012 | Vaha-Sipila | G06F 21/6245 726/1 |
| 2015/0186664 A1 * | 7/2015 | Nicolaou | G06F 21/6281 726/30 |
| 2017/0068954 A1 * | 3/2017 | Hockey | H04L 63/0807 |
| 2018/0041599 A1 * | 2/2018 | Flack | G06F 16/00 |

(Continued)

OTHER PUBLICATIONS

Chen, Hsiao-Jung, Shang-Pin Ma, and Hsueh-Cheng Lu. "Collaborative Security Annotation and Online Testing for Web APIs." 2021 IEEE International Conference on e-Business Engineering (ICEBE). IEEE, 2021. (Year: 2021).*

(Continued)

*Primary Examiner* — Corey Russ
(74) *Attorney, Agent, or Firm* — Brownstein Hyatt Farber Schreck, LLP (57) ABSTRACT

A system for classifying data stored in a collaborative work environment. The system includes a gateway service that receives and processes queries from client devices. The gateway service is configured to query classifications of each API call to determine whether a result of servicing that API call contains classified data. In response to determining that a field of a result of servicing an API call contains classified data, determining whether the API call can be serviced based on the classification.

9 Claims, 5 Drawing Sheets

(56) References Cited

U.S. PATENT DOCUMENTS

| | | | | |
|---|---|---|---|---|
| 2018/0077142 | A1* | 3/2018 | Thakkar | H04L 63/0807 |
| 2018/0329964 | A1* | 11/2018 | Tolani | G06F 16/2455 |
| 2018/0365444 | A1* | 12/2018 | Barday | H04L 67/10 |
| 2019/0129765 | A1* | 5/2019 | Dubodelov | G06F 21/629 |
| 2020/0295923 | A1* | 9/2020 | Weinzettl | H04L 9/14 |
| 2021/0021602 | A1* | 1/2021 | Munn | H04L 9/3263 |
| 2021/0037018 | A1* | 2/2021 | Joyce | H04L 63/0209 |
| 2021/0124684 | A1* | 4/2021 | Russell | G06F 12/0855 |
| 2022/0327236 | A1* | 10/2022 | Schenkein | H04L 63/0281 |

OTHER PUBLICATIONS

Suzic, Bojan, and Milan Latinovic. "Rethinking Authorization Management of Web-APIs." 2020 IEEE International Conference on Pervasive Computing and Communications (PerCom). IEEE, 2020. (Year: 2020).*

* cited by examiner

DATA CLASSIFICATION IN APPLICATION PROGRAMMING INTERFACES AT ATTRIBUTE LEVEL

CROSS-REFERENCE TO RELATED APPLICATION(S)

This application is a nonprovisional patent application of and claims the benefit of U.S. Provisional Patent Application No. 63/002,589 filed Mar. 31, 2020 and titled "Data Classification In Application Programming Interfaces at Attribute Level," the disclosure of which is hereby incorporated herein by reference in its entirety.

TECHNICAL FIELD

Embodiments described herein relate to collaborative work environments and, in particular, to automated systems and methods for data classification and policy management in a collaborative work environments.

BACKGROUND

An organization can establish a collaborative work environment by self-hosting, or providing its employees with access to, one or more platforms or services to facilitate cooperation and completion of work related to common goals. In many cases, a collaborative work environment is defined by multiple purpose-configured collaboration tools (e.g., issue tracking systems, documentation systems, code repository systems, and so on), which may be leveraged by teams to share information.

However, in many circumstances, content stored in a collaboration tool may be confidential or otherwise sensitive, such as personally identifiable information, personal health information, or trade secret information. Inadvertent disclosure of such information can present a business risk and/or legal liability. As such, organizations and governments have developed policies and regulations setting requirements for handing and storing of sensitive data or information.

Under such regulations, organizations may receive data subject access requests which organizations must respond to by providing (1) confirmation that an individual's data is being processed, (2) access to the individuals personal data, (3) the purpose for processing and/or storing the data, (4) the recipients whom the personal data has been or will be disclosed, (5) the estimated period for which the personal data will be stored, and/or (6) any relevant information about how the personal data was obtained.

With conventional systems and data storage architectures, responding to such requests under the requirements of new data regulations such as the General Data Protection Regulation (also referred to as "GDPR") can be extremely burdensome on an organization due to the resources required to classify, identify, retrieve, and/or delete such data. For example, managers/owners of conventional systems typically define and/or outline resource intensive procedures or policies for manually tagging or classifying existing data records with different data classifications so that such data classifications can be used to govern the corresponding data.

However, if a data classification is updated or changed, such changes must be propagated across multiple databases and systems, resulting in additional overhead and resources devoted to making updates to individual pieces of data. Once data is classified or tagged, such data can be shared with other microservices or third parties, queried for, and/or deleted. However, even if such data is sufficiently classified, it is difficult to determine how a piece of data is allowed to be shared with and accessed by requesting entities or individuals.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for tagging and/or classifying, at an application programing interface ("API") gateway, API calls that may be made to one or more services (or microservices) defining a collaborative work environment. The API calls can be classified based on the type of data associated with each respective API call. More specifically, each available API call in a collaborative work environment can be classified according to a data security or data governance policy or regulation. As a result of these constructions and techniques, sensitive information associated with a particular API call can be automatically tagged or classified based on the manner with which that data is accessed (e.g., the associated API call). Similarly, by querying a database of API call classifications, a system as described herein can readily identify where particular sensitive data and how that sensitive data may be accessed (e.g., by identifying an associated API call having a particular classification).

In this manner, an organization implementing the techniques described herein may not be required to manually classify sensitive data, whether that data is already existing or is new data added to a particular system or database by a user, and may not be required to manually locate relevant data in order to respond to data access requests or data deletion requests.

In addition, as may be appreciated by a person of skill in the art, the systems and methods described herein dramatically simplify processes associated isolating and controlling access to sensitive information that may be created (and later accessed) when leveraging software as a service (herein a "software service") provided by a third-party. More particularly, by classifying data at an API call level, both first-party software services and third-party software services can be used in a collaborative work environment while maintaining compliance with data governance policies and regulations. As such, sensitive information can be stored and accessed using any suitable method or system, whether such a method or system is a first party method or system or a third party method or system.

As used herein, the phrase "sensitive information" may be used to refer to any and all content, data, metadata, or other information regardless of form or format that relates to, describes, is authored, developed, created, or otherwise added by, edited by, (or otherwise provided for the benefit of), a user of a software service. Sensitive information can include personal data, private data, health information, personally-identifying information, business information, trade secret content, copyrighted content or information, restricted access information, research and development information, classified information, mutually-owned information (e.g., with a third party or government entity), or any other information. In many examples, although not required, sensitive information may include information that is classified in some manner, according to some procedure or protocol.

Embodiments described herein may be particularly useful to an organization self-hosting, or providing its employees with access to, a number of different platforms and/or software services to establish a collaborative, cooperative and efficient work environment. Herein, such software services can be referred to as "collaboration tools" or "collaboration services." Example collaboration services such as described herein can include but may not be limited to: messaging services; telecommunication services; videoconferencing services; issue tracking services; repository services; documentation services; document management systems; knowledge sharing systems; project management services; enterprise resource planning services; supply chain management services; and so on. Any content added to any of these services, including input(s) provided to customize a particular instance (or tenant experience) of a particular collaboration service, can be considered sensitive information subject to classification, as described herein.

One example of a collaboration service/software service, as described herein, is a project management system or tool that can be implemented in whole or in part as an instance or tenant of an instance of software executed by a container, a virtual server, or a physical server (or other computing appliance or combination of appliances) that provides a team of individuals with a means for communicating and exchanging information with one another. All information exchanged through and/or added to a project management system or tool can be considered sensitive information subject to classification, as described herein. For convenient reference, such information may be referred to herein as "classified information."

In some examples, a collaboration service can be configured for use by a software development team to exchange information that can facilitate the completion and assignment of discrete tasks related to software development projects from creation of new user stories (e.g., user-perspective feature requests or desired functionality), through proof of concept testing, through integration testing, through release of software to one or more users, and through reporting and fixing of software errors ("bugs"). Each data item associated with each above-described function can be considered classified information, as described herein.

In other cases, a collaboration service can be configured for non-software related purposes, such as for use by a human resources team, an information technology support group, and so on. As with other examples introduced above, any configuration or addition of information to any collaboration service described herein can be considered classified information or content, as described herein.

In view of the foregoing it may be appreciated that generally and broadly a collaboration service, which may be a portion of a collaborative work environment, such as described herein, can be used to (1) facilitate exchange any quantity of classified information including files, text content, or information, (2) facilitate text, audio, or video communication, or (2) to facilitate any other suitable collaboration or communication purpose. In this manner, a collaboration service increases efficiency of a team of individuals working on a common goal or project by increasing the speed by which information can be shared between team members, between supervisors and subordinates, and between management and staff.

To perform these functions, a software service, however configured or used by a team of individuals or an organization, can implement a client-server architecture in which a host server or service associated with the collaboration service receives requests from and provides responses to (some or all of which may comply with a communication protocol such as HTTP, TCP, UDP, and the like) one or more client devices, each of which may be operated by a user of the collaboration service. In other cases, a request-response architecture may not be required and other communication and information transaction techniques may be used. For simplicity of description, examples that follow reference a request-response architecture, but it may be appreciated that different collaboration services may be configured to serve and/or host information, including classified information, in a number of suitable ways.

In these examples, more specifically, a host server supporting one or more functions of a collaboration service such as described herein can serve information, including classified data or information, to a client device and, in response, the client device can render a graphical user interface on a display to present at least a portion of that content to a user of that client device.

For example, a collaboration service can serve an informational page for each project tracked by the collaboration service that provides contact information for a team of individuals responsible for working on that respective project. In another example, a collaboration service can host a page associated with a human resources department of an organization that provides a quick reference to a number of facts about that organization or an individual, such as health insurance information, tax withholding information, the number or address of various offices, the names of executives, salary ranges for different positions, and so on.

In many examples, collaboration services maintain at least one internal database that is typically configured to store information, including classified information, associated with that tool or service. In this manner, when a client device submits a request for content to a host server supporting the collaboration service, the collaboration service accesses the internal database to retrieve one or more items of content responsive to the request.

In many constructions, a collaborative work environment can include a gateway service that manages, aggregates, and organizes API calls to and between various collaboration tools and subservices thereof. For embodiments described herein, the gateway service can be coupled to a database or data service that stores information in a database or table tagging or classifying API calls as described above.

As a result, the gateway service (as an intermediary between client devices and collaboration tools), can automatically classify data that is requested and served by tagging and/or classifying that data according to a classification and/or tag of an API call used to request or serve that data. As may be appreciated by a person of skill in the art, such a system as described herein can be leveraged to ensure that organizational policies regarding classified data are maintained (e.g., in lieu of relying on accuracy of data-level classifications, which may be incorrect if manually entered), that data access requests are promptly serviced, and that data deletion requests are accurately, comprehensively, and promptly fulfilled.

Figure 1:
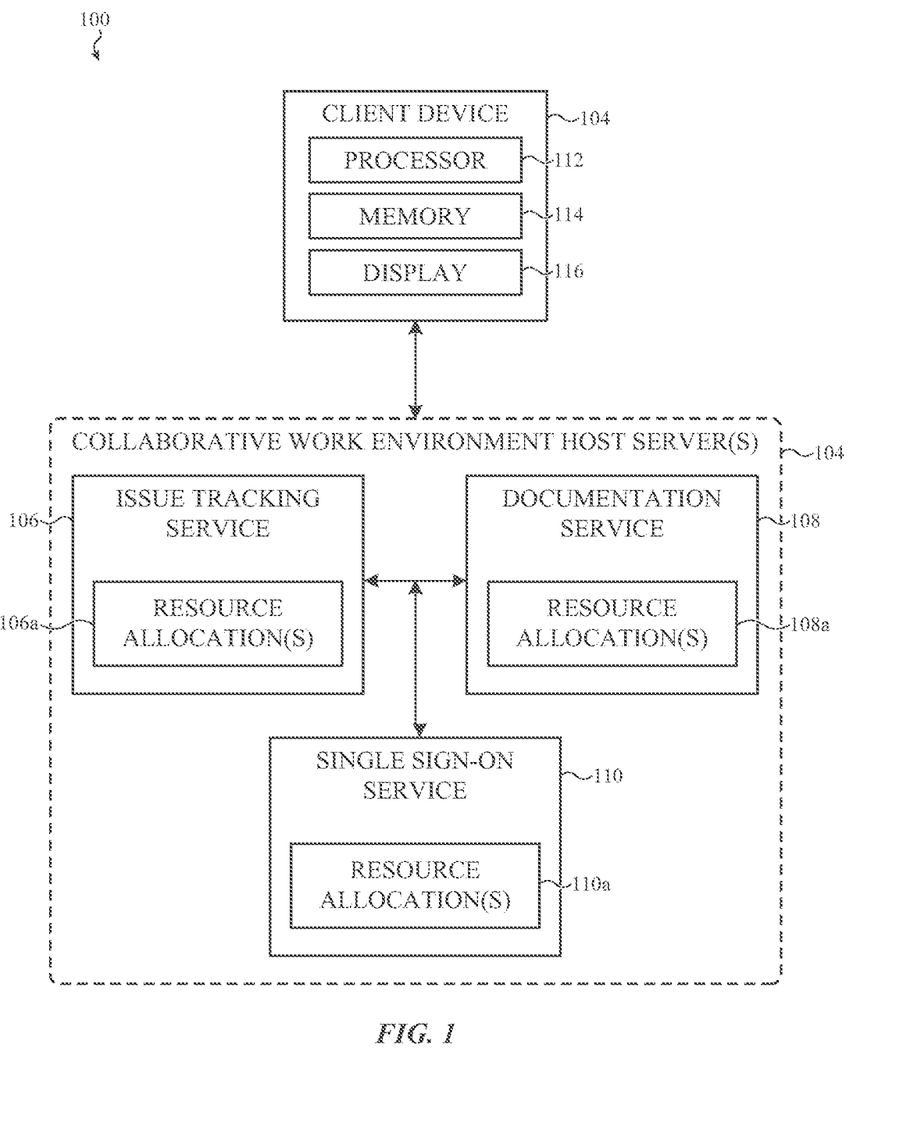
FIG. 1 depicts an example collaborative work environment that can include multiple discrete services

FIG. 1 depicts a collaborative work environment including multiple discrete collaboration tools, such as described herein.

The collaborative work environment 100 includes a set of host servers 102 that may be configured to instantiate one or more individual collaboration tools that cooperate to define the collaborative work environment 100. More particularly, the set of host servers 102 can be configured to communicably couple, either collectively (e.g., through a single or limited set of gateway services) or individually with a client device 104. In many cases, although not required, the client device 104 is configured to communicably couple to one or more of the host servers of the set of host servers 102 across the open internet, but this may not be required of all embodiments.

In some examples, the client device 104 can be configured to access a private network to which each or all of the host servers of the set of host servers are coupled as well; many communications protocols and networks may be used, the depicted embodiment is merely one example construction. Similarly, it may be appreciated that in some examples, the client device 104 is communicably coupled to one or more host servers via one or more intermediate elements or networking devices, such as firewalls, packet shapers, antivirus scanners, gateways, and so on. A person of skill in the art may appreciate that the simplified system diagram illustrated in FIG. 1 is not exhaustive of all network architectures that can support a system as described herein.

As noted above, the collaborative work environment 100 can include multiple independent and purpose configured collaboration tools. In the illustrated example, the collaborative work environment 100 includes an issue tracking service 104, a documentation service 108, and a single sign-on service 110.

Each of the issue tracking service 106, the documentation service 108, and the single sign-on service 110 can be configured to operate as an instance of software independently instantiated over a server system, such as over one or more physical servers associated with the set of host servers 102. In some cases, one or more of the issue tracking service 106, the documentation service 108, and the single sign-on service 110 may be instantiated over the same physical resources (e.g., memory, processor, and so on), whereas in other cases, each of the issue tracking service 106, the documentation service 108, and the single sign-on service 110 are instantiated over different, independent, and distinct physical hardware.

As the manner by which the issue tracking service 106, the documentation service 108, and the single sign-on service 110 are instantiated varies from embodiment to embodiment, FIG. 1 depicts each of the issue tracking service 106, the documentation service 108, and the single sign-on service 110 as supported by dedicated resource allocations. In particular, the issue tracking service 106 is supported by the resource allocation 106a, the documentation service 108 is supported by the resource allocation 108a, and the single sign-on service 110 is supported by the resource allocation 110a.

As with other embodiments described herein, the resource allocations supporting the issue tracking service 106, the documentation service 108, and the single sign-on service 110 can each include a processor allocation and a memory allocation. The processor and memory allocations may be static and/or may be scalable and dynamically resizable.

In many embodiments, the memory allocations of the issue tracking service 106, the documentation service 108, and the single sign-on service 110 include at least a data store or other data base and a working memory allocation. The data store can be configured to provide durable storage for user/team generated content associated with the associated system/service.

As a result of these constructions, each of the issue tracking service 106, the documentation service 108, and the single sign-on service 110 can be instantiated in response to a respective processor allocation accessing from a respective data store at least one executable asset (e.g., compiled binary, executable code, other computer instructions, and so on). Thereafter, the processor allocation can load at least a portion of the executable asset into the respective working memory allocation in order to instantiate respective instances of the issue tracking service 106, the documentation service 108, and the single sign-on service 110.

In further constructions, each of the issue tracking service 106, the documentation service 108, and the single sign-on service 110 may be a multitenant service in which subinstances and/or tenant-specific environments may be defined upon instantiation of the issue tracking service 106, the documentation service 108, and/or the single sign-on service 110. More generally, it may be appreciated that multiple constructions are possible.

Once each of the issue tracking service 106, the documentation service 108, and the single sign-on service 110 are instantiated, the issue tracking service 106 can be configured to communicably couple to the documentation service 108 and/or the single sign-on service 110. As a result of this construction, the documentation service 108 can obtain content from the issue tracking service 106, and likewise the issue tracking service can obtain content from the documentation service 108. More broadly, it may be appreciated that each collaboration tool described and depicted can store, in one or more databases, classified information as described herein.

In many cases, as noted above, each of the documentation service 108 and the issue tracking service 106 are configured to gate access to content stored within a data store of a memory allocation thereof by servicing only queries for information that are accompanied by a session identifier or SSO token provided and/or verified by the single sign-on service 110. In this manner, data security can be ensured while different collaboration tools are communicating with one another.

As with other embodiments described herein, a user of the client device 104 can interact with the collaborative work environment 100 in a number of ways. In particular, in many examples, the client device 104 is configured to access one or more of the collaboration tools of the collaborative work environment 100 in order to display content stored therein.

For example, the client device 104 may be a desktop computing device used by a user of the collaborative work environment 100. In this example, the user may execute a client application on the client device 104 in order to access content from the issue tracking service 106 or the documentation service 108. In some cases, as noted above, the client application may be a web browser application and/or may be a purpose configured application configured to access only one of the collaboration tool of the collaborative work environment.

More particularly, the client device 104 can leverage a processor 112 to access a memory 114 to access at least one executable asset from a durable, long-term, allocation of that memory 114. Upon accessing the executable asset from the memory 114, the processor 112 can be configured to load that executable asset into working memory in order to instantiate an instance of the above-referenced client application, which may be a browser or an application specific to one or more of the collaboration tools of the collaborative work environment 100. Once instantiated, the client application can be configured to render a graphical user interface that may be shown and/or displayed in an active display area of a display 116.

Once instantiated, the client application can be configured to access, as one example, the document documentation service 108. In particular the client application may be configured to request from the documentation service 108 a particular page. In response to the request, the documentation service 108 can access a database or more than one databases or data stores, whether local or remote, in order to service the request by the client application. Any one of these API calls may be associated with one or more content items of classified data. For example a requested page can include personally identifying information.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, a collaborative work environment such as described in reference to FIG. 1 can include more than just an issue tracking system and a documentation system and a single-sign on service; any suitable number of individual or purpose-configured collaboration tools can be used.

Some of the collaboration tools of a collaborative work environment can be self-hosted and/or local to a particular end user. In other cases, one or more collaboration tools of a collaborative work environment may be executed on remote host servers. In a more general phrasing it may be appreciated that some collaboration tools of a collaborative work environment can be accessed via a first network, which may be a closed network, whereas others may be accessed via the open Internet.

In still further examples, some collaboration tools may be configured to provide access to user-generated or team-generated content stored therein by rendering a graphical user interface within a web browser of a client device. In other cases a collaboration tool may implement a client-server architecture in which a client device executes an instance of a purpose configured client application that is configured to access a purpose-configured server-side host service of a collaboration tool. More generally, it may be appreciated that some collaboration tools may be configured to be accessed via a web browser whereas others may be configured to be accessed by a particular client application.

Each of these described architectures, as it may be appreciated by a person of skill in the art, may be supported by one or more APIs, facilitating access to data or functions or services. As noted above, each possible API call can be associated with a particular classification—if the result of calling that particular API call returns classified information. For example, a call for a landing page may be performed by submitting a GET request to a page at the URL/API/v2/landing_page. In this example, the landing page may not store any classified information, so the API call to the endpoint/API/v2/landing_page may be classified as "open" or may not be classified at all.

It may be appreciated that these example classifications are merely examples; any suitable classification schema can be used.

Alternatively, a different API endpoint and/or API call may be associated with a different classification. For example, an API call to/API/v2/user123/birthday may result in a response that includes personally identifiable information, such as the birthday of the user123. In this example, the API call/endpoint of/API/v2/user123/birthday may be tagged or classified as "PII" or "Personally Identifiable Information." As a result, any data returned from a respective service serving this API endpoint may be automatically tagged as PII. For example, in a conventional system, a response to the above-referenced API call may be a JSON object that denotes a birthday for User123 as Jan. 1, 2000:

{
"api_call": "/API/v2/user123/birthday",
"data": "2000 Jan. 1"}
}

For embodiments described herein, the API call result may itself be tagged based on the tag associated with the API call. For example, a result may be a JSON object:

{
"api_call": "/API/v2/user123/birthday",
"data": "2000 Jan. 1",
"classification": "PII"
}

As a result of this classification now applied to the data from the request itself, downstream services receiving this response (e.g., another collaboration tool, an end-user device), may be able to automatically apply a PII-specific policy to handling of that data.

In other cases, other operations or tasks may be triggered (e.g., at a gateway service) to ensure that particularly-classified data is being served to and/or otherwise handled in a policy-compliant manner.

In yet other examples, API calls which have a particular classification can be listed and/or enumerated. For example, an API call classification database can be queried to return all API calls that are classified as "PII." A result of such a query may be an JSON object such as:
```
{
    "query":    "SELECT*FROM    api_classifications
        WHERE
        classification IN (PII);",
    "result": ["/API/v2/<
    user>/birthday",
    "/API/v2/<user>/ssn",
    "/API/v2/<user>/username",
    "/API/v2/<user>/salary"]
}
```
As may be appreciated by a person of skill in the art, a listing of all API calls having or being associated with a particular classification can dramatically simplify generation of data access requests and/or data deletion requests. For example, taking the preceding example, executing DELETE commands in sequence can ensure that all PII-classified data associated with a particular input user (e.g., "<user>") can be quickly and efficiently processed.

Figure 2:
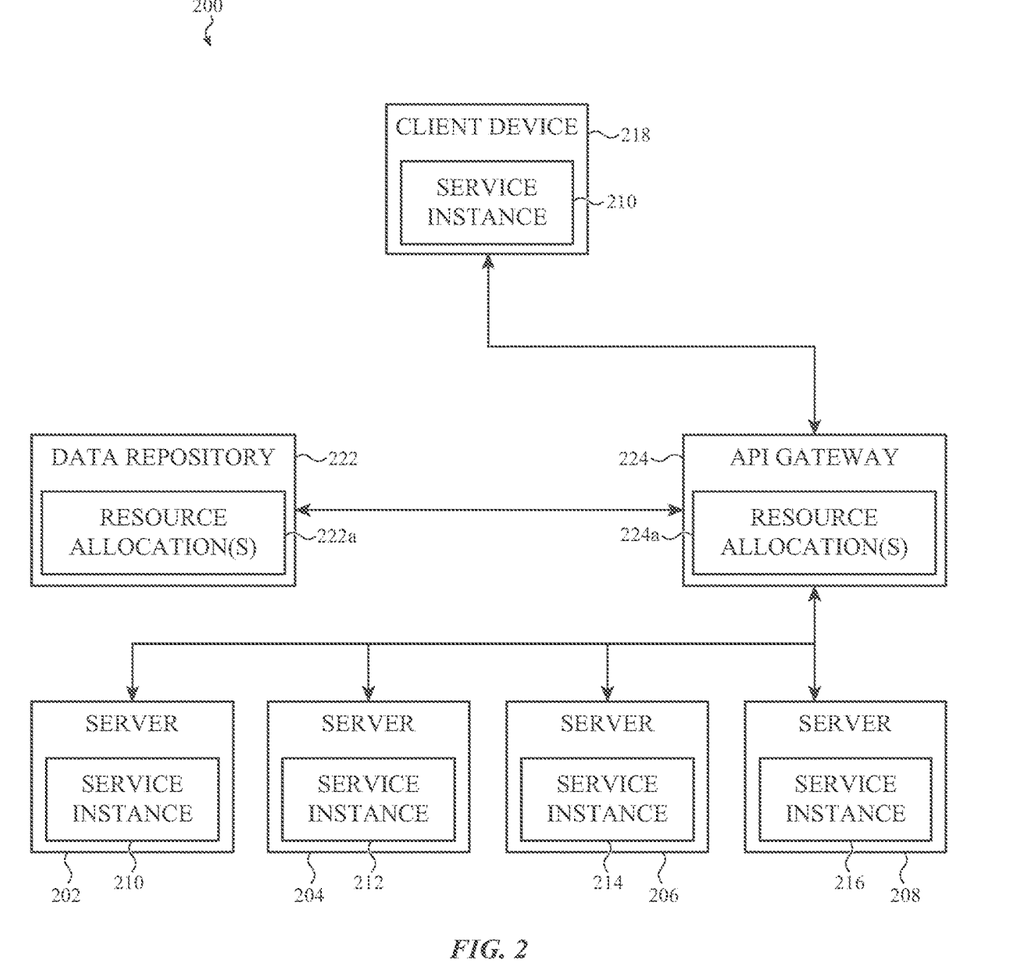
FIG. 2 illustrates an example computing system and/or network (e.g., a collaborative work environment) including an API classification data repository coupled to a gateway service.

FIG. 2 illustrates a system in which the techniques described may be practiced, according to one embodiment.

In one embodiment, a computing system and/or network 200 comprises components that are implemented at least partially by hardware at one or more computing devices, such as one or more hardware processors executing stored program instructions stored in one or more memories for performing the functions that are described herein.

In other words, all functions described herein are intended to indicate operations that are performed using programming in a special-purpose computer or general-purpose computer, in various embodiments. FIG. 2 illustrates only one of many possible arrangements of components configured to execute the programming described herein. Other arrangements may include fewer or different components, and the division of work between the components may vary depending on the arrangement The computing system and/or network 200 of FIG. 2 includes server computers 202, 204, 206, 208 (each of which is associated with a particular collaboration tool or service, identified in the figure as the service instances 210, 212, 214, and 216 respectively) client computer 218 (also referred to as a client device), API gateway 224, and data repository 222. Each of these server computers and/or services can be associated with respective resource allocations, such as described above. For example, each may be associated with a memory allocation and a processor allocation.

The processor allocation can be configured to access at least one executable asset from the memory allocation in order to instantiate at least a part of a service hosted by each respective server. In particular, the data repository 222 is associated with the resource allocation 222a and the API gateway is associated with the resource allocation 224a. Similarly, each of the server computers 202, 204, 206, and 208 are associated with respective resource allocations that, in turn, can be configured and/or otherwise leveraged to instantiate respective service instances.

The client application 220 is, in some embodiments, a software application that sends requests to API gateway 224 using defined application programming interface (API) calls. A programmatic call, or other digital electronic message transmitted in the network, may comprise a request. Client application 220 is hosted on client computer 218. A client computer may be any suitable device, for example a mobile device (e.g. a tablet or mobile phone), a portable device (such as laptop computer), or any other computing device (e.g. a desktop computer). Client application 220 includes instructions and data stored in the memory (e.g. non-transient compute readable media) of the computing device on which the client application is installed/run. These instructions are executed by the processor of the computing device to perform various functions as described herein.

In one embodiment, data repository 222 may be any suitable storage device such as one or more hard disk drives, memories, or any other electronic digital data recording device configured to store data. Although data repository 222 is depicted as a single device in FIG. 2, data repository 222 may span multiple devices located in one or more physical locations. For example, data repository 222 may be one or more nodes of one or more data warehouse(s). Additionally, in one embodiment, data repository 222 may be located on the same device(s) as any of API gateway 224.

Alternatively, data repository 222 may be located on a separate device(s) from API gateway 224. Additionally, data storage devices may be located on each client device associated with a computing system, such as an enterprise or work computing system. Any combination of the above may be used.

Data repository 222 may include one or more databases implemented using any suitable methodology, such as a relational database, a columnar database, etc. The database may be of any size, portioned into any number of rows, columns, or tables, and may be organized in any manner. In a multitenant embodiment, data stored on data repository 222 may relate to any number of different tenants, such as hundreds to thousands of tenants or more depending on resource capacity and throughput. The data stored on data repository 222 may relate to any type of data. Individual data records may have any number of fields (e.g., attributes), components, or other aspects.

In some embodiments, data stored in data repository 222 may include API contract data and transaction history data, as described herein.

As noted above, each server computer 202, 204, 206, 208 may comprise one or more cores, processors, computers, and/or virtual machine instances hosted on the premises of an enterprise or using a public or private cloud computing facility. Each server computer 202, 204, 206, 208 is communicatively connected to API gateway 224 using any suitable wired or wireless connection, including, but not limited to: a Local Area Network (LAN), a Wide Area Network (WAN), the Internet, a company network, etc. Each server computer 202, 204, 206, 208 hosts or executes a respective service 210, 212, 214, 216, as discussed herein, which may facilitate communication with other components of system 200.

Each service 210, 212, 214, 216 comprises instructions and data stored in the memory (e.g. non-transient compute readable media) of the respective server computer 202, 204, 206, 208 on which the service is executed. These instructions are executed by the processor of the computing device to perform various functions as described herein.

Server computers 202, 204, 206, 208, API gateway 224, and client computer 218 communicate with each other directly or indirectly through one or more communications networks. For example, services 210, 212, 214, 216 may communicate with API gateway 224 through a local area network (LAN) of an enterprise in one embodiment. In this case the services 210, 212, 214, 216 may be implemented as an on-premises solution in which services 210, 212, 214, 216 are associated with the same business enterprise.

In another embodiment, a service 210, 212, 214, 216 may represent a third party service that may be located off-premises with respect to an organization, such as in a shared data center or cloud computing facility. Each of the services may be implemented using respective sets of stored program instructions.

In one embodiment, each service 210, 212, 214, 216 is programmed or configured to provide functionality or a set of software functionalities, such as the retrieval of specified information or the execution of a set of operations, with a purpose that clients or services can reuse for different purposes. An example of a service is a profile retrieval service that includes functionality to retrieve profile data from a database when requested. Another example of a service is an interface rending service that renders a custom web interface for web users when requested.

Each service 210, 212, 214, 216 defines one or more APIs that serve as contracts to allow other services and client applications to communicate with the respective service 210, 212, 214, 216.

As referred to herein, an API definition of a service comprises a set of operations that allow clients and services to communicate with the service. An API definition defines a contract between a requestor and a service such that if the requestor makes a request in a specific format in the API definition, the service will generate response in a specific format or initiate a defined action as specified by the API definition. An API definition for a service may be stored in API contract data. When a service 210, 212, 214, 216 is connected to API gateway 224, the service 210, 212, 214, 216 shares API contract data with API gateway 224, which stores API contract data in data repository 222

API contract data comprises one or more API definitions for interacting with one or more corresponding services. An API definition may include one or more data fields that each may be associated with a data classification. In some embodiments, functions, procedures, or entire data objects defined in an API of a service may be associated with a data classification.

For example, API contract data may include an API definition for interacting with Service A. The API definition may include a "name" field that is associated with a "Personally Identifiable Information" data classification:
{
  name:string! @DataClassificationLabel ("Personally Identifiable Information")
  email: string!
  phone: int!
}

This example JSON object illustrates an API definition for a service. As shown, the "name:" data field is labeled in the API definition with a data classification of "Personally Identifiable Information". As discussed above, services 210, 212, 214, 216 are configured to share API contract data, such as the API definition, with API gateway 224, which stores API contract data in data repository 222.

In one embodiment, API gateway 224 comprises a server computer or service hosted by a server computer that provides a single entry point to system 200. API gateway 224 may comprise a server computer, similar to server computers, and include programmatic instructions configured to perform the techniques discussed herein.

In some embodiments, API gateway 224 is programmed or configured to manage requests between services and client application. API gateway 224 is programmed or configured to provide an entry point for every new request being executed by client application 220 or any of services 210, 212, 214, 216.

In some embodiments, API gateway 224 is configured to receive requests to access one or more services 210, 212, 214, 216 and direct the requests to the one or more services 210, 212, 214, 216. Requests may be received at API gateway 224 from any of services 210, 212, 214, 216, client computer 218, or any third party service (not shown in FIG. 2).

In one embodiment, API gateway 224 is programmed or configured store transaction history data. For example, when a service 210, 212, 214, 216 or client application 220 attempts to communicate with another service 210, 212, 214, 216 through API gateway 224, API gateway 224 stores a transaction log entry that includes data about the respective transaction or request. For example, a transaction log entry may indicate that service 210 called service 212 for asking for the data fields "ID" and "name".

In one embodiment, API gateway 224 is programmed or configured to accept or deny access to one or more services 210, 212, 214, 216. For example, service 212 may transmit a request to API gateway 224 to access a particular data field of service 210. API gateway 224 may then query data repository 222 for API contract data to determine data classifications of the particular data field of the API definition associated with service 210. API gateway 224 may then determine whether data access privilege values associated with the request satisfy data classification restriction criteria associated with the data classifications of the particular data field of service 210. If the data access privilege values satisfy the data classification restriction criteria, API gateway 224 transmits the request to service 210. Service 210 may then directly transmit the requested data to service 212.

Alternatively, service 210 may transmit the requested data to API gateway 224 which then transmits the data to service 212. If the data access privilege values do not satisfy the data classification restriction criteria, API gateway 224 restricts or blocks the transmission of the request to the particular service; in some embodiments, a message indicating a denial of the request may be transmitted back. In an embodiment, data access privilege values that are stored or transmitted can be used to respectively indicate one or more data access privileges.

In one embodiment, API gateway 224 is programmed or configured to generate a report based on identifying data dependencies between services 210, 212, 214, 216. For example, API gateway 224 may include instructions that scan transaction history data stored in data repository to determine that service 210 shares data fields "ID" and "name" with service 212.

When a client issues an access request (i.e. a request for information) regarding a particular data field, API gateway 224 is configured to generate a report based on identified data dependencies that indicates a data flow of the particular data field throughout multiple services. A report may include for example, a list of services that the particular data field is accessed by, a description of the functionality of each service in the list of services, how and/or why each service shares data, and any other information related to the list of services and/or particular data field.

In one embodiment, API gateway 224 is programmed or configured to generate alerts based on identifying data dependencies between services 210, 212, 214, 216. For example, API gateway 224 may identify, using transaction history data, that service 210 shares data fields "ID" and "name" with service 212. API gateway 224 may also identify, using API contract data stored in data repository 222, that the "name" data field from an API definition of service 210 is associated with a "PII" data classification. API gateway 224 may further identify that the "name" data field from an API definition of service 212 is not associated with a "PII" data classification. Thus, using such identifications, API gateway may determine that the "name" data field has a different data classification in the API definitions of two different services 210, 212. This determination may lead to the generation of an alert that indicates that the API definitions of multiple services (i.e. services 210, 212) are not synchronized. Such an alert may be transmitted to a system administer and/or stored in data repository 222 for review.

In one embodiment, API gateway 224 is programmed or configured to automatically update an API definition of a service 210, 212, 214, 216. For example, API gateway 224 may identify, using transaction history data, that service 210 shares data fields "ID" and "name" with service 212. API gateway 224 may also identify, using API contract data stored in data repository 222, that the "name" data field from an API definition of service 210 is associated with a "PII" data classification.

API gateway 224 may further identify that the "name" data field from an API definition of service 212 is not associated with a "PII" data classification. Using such identifications, API gateway 224 may determine that the "name" data field has a different data classification in the API definitions of two different services 210, 212. In response to this determination, API gateway 224 may update the API definition of service 212 in API contract data to indicate that the "name" data filed is associated with a "PII" data classification. API gateway 224 may then transmit the updated API contract data to service 212 to cause updating the API definition of service 212.

These foregoing embodiments depicted in FIGS. 1-2 and the various alternatives thereof and variations thereto are presented, generally, for purposes of explanation, and to facilitate an understanding of various configurations and constructions of an API call tagging system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. For example, a computer or server as described herein can be configured in a number of ways.

For example, according to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computing system and/or networks, portable computing system and/or networks, handheld devices, networking devices or any other device that incorporates hard-wired and program logic to implement the techniques.

Figure 3:
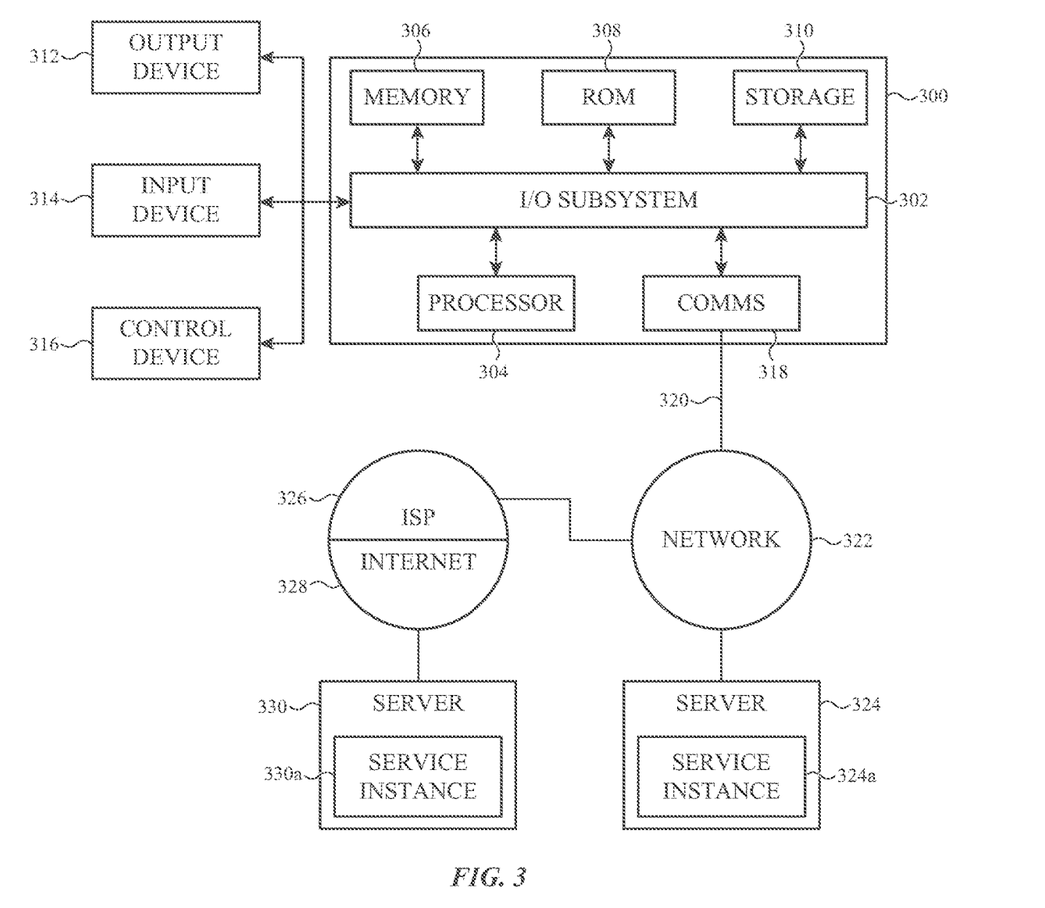
FIG. 3 illustrates a computing system and/or network that may be configured to implement a method described herein.

For example, FIG. 3 is a block diagram that illustrates a computing system and/or network 300 upon which an embodiment of the invention may be implemented. Computing system and/or network 300 includes a bus 302 or other communication mechanism for communicating information, and a hardware processor 304 coupled with bus 302 for processing information. Hardware processor 304 may be, for example, a general purpose microprocessor.

Computing system and/or network 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computing system and/or network 300 into a special-purpose machine that is customized to perform the operations specified in the instructions.

Computing system and/or network 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computing system and/or network 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computing system and/or network 300 may implement the techniques described herein using customized hard-wired logic, one or more ASICs or FPGAs, firmware and program logic which in combination with the computing system and/or network causes or programs computing system and/or network 300 to be a special-purpose machine. According to one embodiment, the techniques herein are performed by computing system and/or network 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computing system and/or network 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computing system and/or network 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection tof a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world-wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computing system and/or network 300, are example forms of transmission media.

Computing system and/or network 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and stored in storage device 310, or other non-volatile storage for later execution.

These foregoing embodiments depicted in FIGS. 1-3 and the various alternatives thereof and variations thereto are presented, generally, for purposes of explanation, and to facilitate an understanding of various configurations and constructions of an API call tagging system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. For example, a method of operating a server, in particular implementing a gateway service, can include many different operations.

Figure 4:
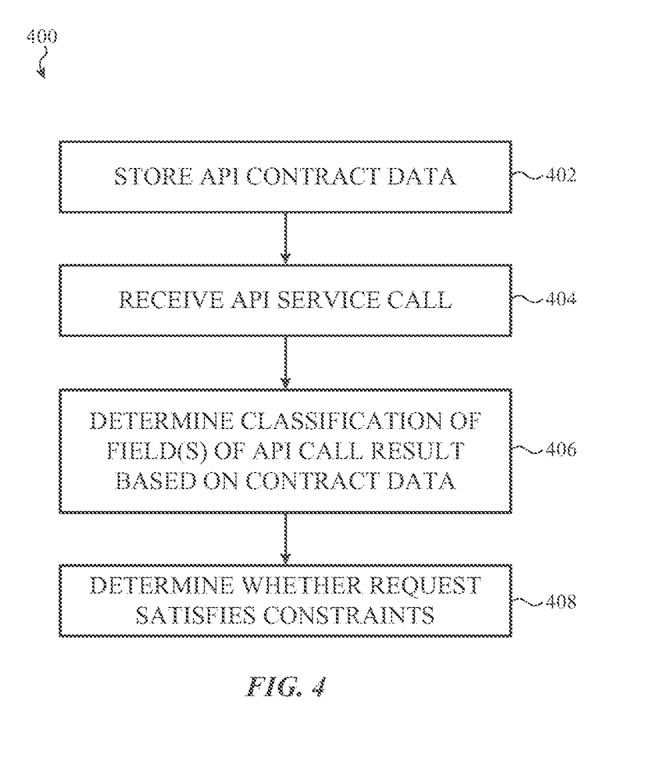
FIG. 4 is a flow chart depicting example operations of a programmable algorithm or method for managing access requests using data classification in an API.

FIG. 4 illustrates an example programmable algorithm or method for managing access requests using data classification in an API. Although the steps in FIG. 4 are shown in an order, the steps of FIG. 4 may be performed in any order, and are not limited to the order shown in FIG. 4. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 402, application programming interface (API) contract data is digitally stored in one or more data repositories. The API contract data includes a plurality of API definitions for a plurality of services that are implemented using respective sets of stored program instructions. Each API definition of the plurality of API definitions includes one or more data fields associated with different data classifications. For example, services 210, 212, 214, 216 may share their respective API definitions with API gateway, which then stores the API definitions as API contract data in data repository 222.

In step 404, an electronically transmitted call comprising a request to access a particular data field of a particular service of the plurality of services is received. The request is associated with one or more data access privilege values respectively indicating one or more data access privileges. For example, API gateway 224 receives an access request from one of services 210, 212, 214, 216 or client application 220. API gateway 224 may use an identification of the requesting entity (i.e. service or client application) to determine one or more data access privilege values that are associated with the requesting entity. Alternatively, one or more data access privileges values may be included in the request.

In step 406, it is determined, based on the API contract data, one or more data classifications that are associated with the particular data field of the particular service. For example, API gateway 224 may query data repository 222 for API contract data to determine the one or more data classifications of the particular data field of the API definition associated with the particular service.

In step 408, it is determined that the one or more data access privilege values associated with the request satisfy one or more data classification restriction criteria associated with the one or more data classifications of the particular data field of the particular service. In response to this determination, the request is transmitted to the particular service. For example, API gateway 224 may query data repository 222 for the one or more data classification restriction criteria associated with the one or more data classifications. API gateway 224 may then compare the data access privilege values to the one or more data classification restriction criteria associated with the one or more data classifications to determine if the data access privilege values satisfy the criteria. If the data access privilege values satisfy the criteria, the request is transmitted to the particular service. If the data access privilege values do not satisfy the criteria the request is not transmitted (i.e. restricted) to the particular service.

By classifying data fields in the API definitions of multiple services, data access requests can be managed using the data classifications in the API definitions without the requirement of manually labeling or tagging each piece of data that flows through a system. Additionally, by storing a transaction log entry each time data moves through the system, specific pieces of data can be traced and located throughout the system by using the transaction entries in conjunction with the API definitions. The techniques herein can permit managing and servicing requests with fewer CPU cycles and less memory needed.

Figure 5:
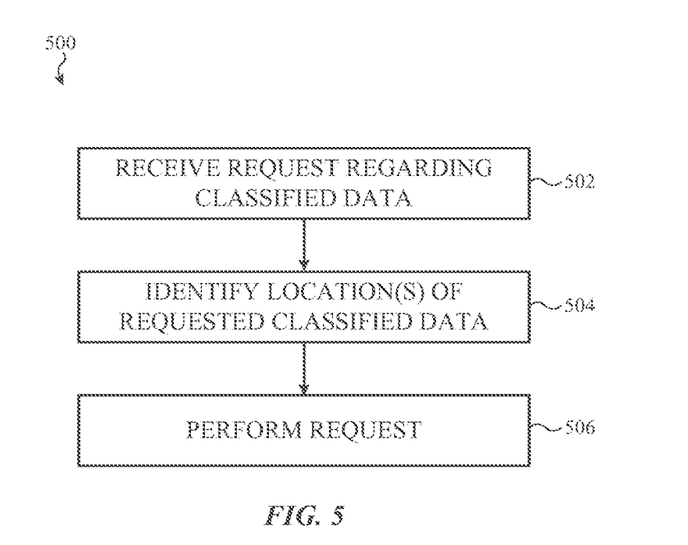
FIG. 5 is a flow chart depicting example operations of another programmable algorithm or method for managing access requests using data classification in an API.

In other examples, other methods can be performed. For example, FIG. 5 depicts example operations of a method of leveraging API classification data to service a particular request that relates to a particular, selected, classification. In particular, the method 500 includes operation 502 at which a request regarding a particular data classification is received. For example, the request can relate to a particular user, a particular account, a particular type of classified information, and so on. Next, at operation 504, the method advances to determine what API calls are associated with the request. For example, the request may identify user123 and a PII classification. In response, at operation 504, all API calls available that receive as input a username, such as user123 that are also classified as "PII" may be returned. Thereafter, at operation 506, the requested operation can be performed. For example, a data deletion request can be serviced by iteratively calling each API call identified at operation 504 to delete data associated with that API call.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

In addition, the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways.

In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

What is claimed is:

1. A method of servicing page requests in a collaborative work environment based on data privacy classification policies, the method comprising:
   receiving, at an API gateway of the collaborative work environment, a page request received from a client application instantiated by a client device;
   determining, by the API gateway based on the page request, a set of API calls to one or more subservices of the collaborative work environment, the set of API calls required to service the page request;
   retrieving, by the API gateway, from a data repository, API contract data in respect of each API call of the set of API calls associated with each respective subservice, the API contract data comprising API definitions defining request and response formats in respect of each subservice;
   determining, by the API gateway, from the API definitions, a set of fields required to construct an API response to the client application suitable to service the page request;
   querying, by the API gateway, a database service to obtain a privacy classification in respect of each field of the set of fields associated with the retrieved API contract data;
   receiving, at the API gateway, in response to the query, a set of privacy classifications each privacy classification of the set of privacy classifications associated with the API contract data;
   identifying, by the API gateway:
      a first subset of fields corresponding to a first subset of privacy classifications associated with the API contract data satisfying a restriction criteria; and
      a second subset of fields corresponding to a second subset of privacy classifications associated with the API contract data failing to satisfy the restriction criteria;
   prior to executing the API calls, modifying, by the API gateway, the API calls to exclude fields from the second subset of fields;
   executing the modified set of API calls;
   receiving data in response to the modified set of API calls; and
   constructing the API response by populating fields of the first subset of fields from the data; and
   returning, by the API gateway, the API response to the client application.

2. The method of claim 1, wherein servicing the request for data by submitting the request for data to the API endpoint comprises forwarding an authentication token to the API endpoint along with the request for data.

3. The method of claim 1, wherein the API endpoint is associated with a respective collaboration tool of the collaboration environment.

4. The method of claim 1, wherein the request for data is a data subject access request.

5. The method of claim 1, wherein the privacy classifications are based on an API definition associated with a respective collaboration tool of the collaboration environment.

6. The method of claim 1, further comprising:
   transmitting, to the client device, a message indicating a denial of a portion of the request comprising the second subset of fields.

7. The method of claim 1, wherein the privacy classifications are based on a personal identifying information-specific policy.

8. A method of servicing data requests for data stored in a collaborative work environment based on privacy classifications policies, the method comprising:
   receiving, at an Application Programming Interface (API) gateway, a page request comprising a request to access data of the collaborative work environment, the page request associated with an access privilege value;
   defining, by the API gateway, a set of API calls to at least two of a plurality subservices defining at least in part the collaborative work environment, the set of API calls required to service the page request;
   retrieving, by the API gateway from a data repository, API contract data in respect of each API call of the set of API calls;
   obtaining, by the API gateway via a database, a privacy classification for each field associated with the retrieved API contract data;
   determining, by the API gateway, that:
      a first subset of fields associated with the API contract data required to service the page request satisfy a restriction criteria in respect of the access privilege value; and
      a second subset of fields associated with the API contract data required to service the page do not satisfy the restriction criteria in respect of the access privilege value;
   prior executing to the set of API calls, modifying, by the API gateway, at least one API calls of the set of API calls, the at least one modified API call comprising the first subset of fields and excluding the second subset of fields;
   executing, by the API gateway, each API call of the set of API calls;
   receiving in response a set of data objects corresponding to the first subset of fields; and
   constructing a page from the set of data objects to service the page request.

9. The method of claim 8, wherein the identifying the first subset of fields comprises comparing the privacy classifications for each field of the first subset of fields to the access privilege value.

* * * * *